US012467079B2

(12) United States Patent
Han et al.

(10) Patent No.: US 12,467,079 B2
(45) Date of Patent: Nov. 11, 2025

(54) HOMOGENEOUS DETECTION METHOD FOR CONTINUOUS DETECTION OF MIRNA BY METAL-ORGANIC FRAMEWORK (MOF)-BASED NANOZYME

(71) Applicant: Qingdao Agricultural University, Qingdao (CN)

(72) Inventors: Lei Han, Qingdao (CN); Zhen Wang, Qingdao (CN); Xiuzhong Wang, Qingdao (CN); Yucui Zhang, Qingdao (CN)

(73) Assignee: Qingdao Agricultural University, Qingdao (CN)

( * ) Notice: Subject to any disclaimer, the term of this patent is extended or adjusted under 35 U.S.C. 154(b) by 475 days.

(21) Appl. No.: 17/937,595

(22) Filed: Oct. 3, 2022

(65) Prior Publication Data

US 2023/0250469 A1 Aug. 10, 2023

(30) Foreign Application Priority Data

Oct. 9, 2021 (CN) .......................... 202111174539.5

(51) Int. Cl.
*C12Q 1/6825* (2018.01)
*G01N 27/327* (2006.01)
*G01N 27/48* (2006.01)

(52) U.S. Cl.
CPC ....... *C12Q 1/6825* (2013.01); *G01N 27/3278* (2013.01); *G01N 27/48* (2013.01); *C12Q 2600/178* (2013.01)

(58) Field of Classification Search
CPC ............ C12Q 1/6825; C12Q 2600/178; C12Q 1/6806; C12Q 1/6816; C12Q 1/682; G01N 27/3278; G01N 27/48
See application file for complete search history.

(56) References Cited

PUBLICATIONS

Li et al., "Electrochemical biosensor for ultrasensitive exosomal miRNA analysis by cascade primer exchange reaction and MOF@Pt@MOF nanozyme," 2020, Biosensors and Bioelectronics, vol. 168, pp. 1-7 (Year: 2020).*

(Continued)

*Primary Examiner* — Luan V Van
*Assistant Examiner* — Kaylee Tseng
(74) *Attorney, Agent, or Firm* — M&B IP ANALYSTS, LLC

(57) ABSTRACT

Provided is a method for continuous detection of a miRNA by a metal-organic framework (MOF)-based nanozyme, including the following steps: step 1, conducting a duplex-specific nuclease (DSN)-assisted signal amplification strategy; and step 2, conducting the flow analysis on a target using a flow injection-batch method, and recording a differential pulse voltammetry (DPV) response of a biosensor in a batch mode; and step 3, in the flow mode, conducting competitive elution on a MOF/indium tin oxide (ITO) electrode with a complementary DNA (cDNA) as a mobile phase. In the present invention, a two-dimensional MOF-based nanozyme is simply synthesized by an ultrasonic method and then applied to a homogeneous electrochemical biosensor without a complicated electrode modification process, showing a continuous detection function, a high selectivity and a desirable sensitivity.

7 Claims, 11 Drawing Sheets

(56) References Cited

PUBLICATIONS

Sun et al., "Black phosphorus nanosheets adhering to thionine-doped 2D MOF as a smart aptasensor enabling accurate capture and ratiometric electrochemical detection of target microRNA," 2020, Sensors and Actuators B: Chemical, vol. 309, pp. 1-9 (Year: 2020).*
Zhao et al., "Co3O4-Au polyhedron mimic peroxidase- and cascade enzyme-assisted cycling process-based photoelectrochemical biosensor for monitoring of miRNA-141," 2021, vol. 406, pp. 1-8 (Year: 2021).*
Ma et al., "p-Co-BDC/AuNPs-based multiple signal amplification for ultrasensitive electrochemical determination of miRNAs," 2021, Analytica Chimica Acta, vol. 1183, pp. 1-9 (Year: 2021).*
Qiu et al., "Specific Coordination between Zr-MOF and Phosphate-Terminated DNA Coupled with Strand Displacement for the Construction of Reusable and Ultrasensitive Aptasensor," 2020, Analytical Chemistry, vol. 92, pp. 11332-11340 (Year: 2020).*
First Office Action for CN 202111174539.5, dated Apr. 26, 2023. China National Intellectual Property Administration.

* cited by examiner

HOMOGENEOUS DETECTION METHOD FOR CONTINUOUS DETECTION OF MIRNA BY METAL-ORGANIC FRAMEWORK (MOF)-BASED NANOZYME

CROSS REFERENCE TO RELATED APPLICATION

This patent application claims the benefit and priority of Chinese Patent Application No. 202111174539.5, filed with the China National Intellectual Property Administration on Oct. 9, 2021 the disclosure of which is incorporated by reference herein in its entirety as part of the present application.

TECHNICAL FIELD

The present disclosure relates to the technical field of biological detection, in particular to a homogeneous detection method for continuous detection of a miRNA by a metal-organic framework (MOF)-based nanozyme.

BACKGROUND

DNA-based homogeneous analysis refers to an entire sensing process conducted in a homogeneous solution. Compared with traditional heterogeneous analysis methods that are time-consuming and labor-intensive for target identification, homogeneous analysis methods are simple and easy to operate with rapidity, and does not require fixation and washing steps. Therefore, the homogeneous analytical methods have great advantages in electrochemical test systems.

Nanozymes refer to nanomaterials with enzyme-like properties, which have become a research hotspot due to outstanding advantages, showing a wide range of applications in the fields of biosensing and immunoassays. Among them, three-dimensional metal-organic framework (MOF)-based nanozymes have been rapidly developed in the past decade. Compared with 3D bulk MOF-based nanozymes, 2D MOF-based nanozymes have received increasing research attention in recent years due to a larger surface area, more accessible active sites, and smaller diffusion barriers for substrate molecules. 2D MOF-based nanosheets can be prepared by a solvothermal method, surfactant-assisted synthesis, and ultrasonic exfoliation. Compared with the solvothermal method and the surfactant-assisted synthesis that require higher requirements in experimental safety and personnel skills, the ultrasonic exfoliation is simple and easy to implement.

Homogeneous DNA electrochemical experiments are generally conducted under static conditions, while homogeneous electrochemistry is more advantageous under dynamic flow conditions. The flow system can update a phase interface in real time, which not only ensures experimental reproducibility, but also realizes rapid determination. So far, there has been no report on use of the homogeneous electrochemistry in cyclic tests under flow conditions.

SUMMARY

1. Technical Problem to be Solved

In order to solve the problem that there has been no report on use of the homogeneous electrochemistry in cyclic tests under flow conditions in the prior art so far, an objective of the present disclosure is to propose a homogeneous detection method for continuous detection of a miRNA by a MOF-based nanozyme.

2. Technical Solutions

To achieve the above objective, the present disclosure adopts the following technical solutions:

The present disclosure provides a homogeneous detection method for continuous detection of a miRNA by a MOF-based nanozyme, where signal amplification is achieved by a duplex-specific nuclease (DSN)-assisted signal amplification strategy in a homogeneous solution, single-stranded DNAs are enriched by a single-stranded DNA adsorption capacity of the MOF-based nanozyme, further signal amplification is achieved by a peroxidase-mimicking activity of the MOF-based nanozyme, and recycling of a MOF-based nanozyme-modified indium tin oxide (ITO) electrode and continuous detection of a target miRNA are realized in combination with a flow injection-batch method, thus achieving continuous homogeneous detection of the miRNA; and the homogeneous detection method includes following steps:

step 1, conducting the DSN-assisted signal amplification strategy: heating a methylene blue-labeled hairpin DNA sequence to 95° C. for 5 min, and slowly cooling to a room temperature to form a hairpin structure; adding a DSN at a final concentration of 0.15 U to 0.5 U and the hairpin DNA at a final concentration of 0.8 μM. to 1.2 μM to a nucleic acid amplification buffer, adding a miRNA sample to be tested, and conducting incubation at 45° C. to 60° C. for 50 min to 70 min; and adding a DSN stop solution to an obtained reaction solution to terminate the signal amplification;

step 2, conducting continuous detection of the target miRNA by the flow injection-batch method: in a flow mode, injecting a solution obtained in step 1 into an electrochemical analysis cell by flow injection, and conducting incubation in a batch mode for 30 min to 60 min; injecting a phosphate-buffered saline (PBS) containing hydrogen peroxide into the electrochemical analysis cell by flow injection; conducting detection by differential pulse voltammetry (DPV) or linear voltammetry or an impedance method in the batch mode using a three-electrode system to obtain an electrochemical signal, and obtaining a concentration of the miRNA sample to be tested according to a relationship between the electrochemical signal and a miRNA concentration; and step 3, in the flow mode, conducting competitive elution on a DNA of the MOF-based nanozyme-modified ITO electrode using a complementary DNA (cDNA) as a mobile phase; and repeating steps 1 to 3 to conduct a next round of the miRNA detection.

Preferably, in step 1, a reaction system is 100 μL, including: a 1×DSN buffer, 0.2 U of a DSN, 0.8 μM to 1.2 μM of HP, and targets of different concentrations; the reaction system is incubated at 50° C. for 60 min to conduct enzymatic amplification, and a DSN stop solution is added to an obtained reaction solution to terminate the enzymatic amplification.

Preferably, the 1×DSN buffer includes 50 mM of Tris-HCl at a pH value of 8.0, 5 mM of magnesium chloride ($MgCl_2$), and 1 mM of dithiothreitol (DTT).

Preferably, in step 2, the ITO electrode is washed with acetone, absolute ethanol, and a large amount of deionized water sequentially before use, and blow-dried with $N_2$; a cleaned ITO electrode is immersed in a 1 mg/mL ethanol dispersion of the MOF-based nanozvrne, and then naturally-dried to obtain the MOF-based nanozyme-modified ITO (MOF/ITO) electrode; a solution obtained after the DSN-assisted signal amplification is transferred to the MOF/ITO electrode by flow injection, incubated at 37° C. for 40 min to 50 min, and the MOF/ITO electrode is washed with the PBS serving as a mobile phase in the flow mode. A DPV response of a biosensor is recorded using a three-electrode system in the batch mode by introducing a PBS containing hydrogen peroxide into an analytical unit in the flow mode.

Preferably, in step 2, DPV signal detection is conducted by DPV test in a PBS at a pH value of 7.4 containing 1 mM to 2 mM of $H_2O_2$, a biosensor is measured in a 5 mM $K_3[Fe(CN)_6]^{3-/4-}$ solution with 100 mM KCl, characterized by CV and EIS, with a scan potential range of 0 V to −0.4 V and a scan rate of 100 mV/s (VS Ag/AgCl) in the PBS.

Preferably, in step 2, in the 5 mM $K_3[Fe(CN)_6]^{3-/4-}$ solution, the scan potential CV range is at −0.2 V to 0.6 V, the scan rate is at 100 mV/s, an EIS frequency range is at 0.1 Hz to 10,000 Hz, and an AC voltage is 5 mV.

Preferably, in step 2, the flow injection is conducted with a syringe pump at 20 μL/min for 20 min.

3. Beneficial Effects

Compared with the prior art, the present disclosure has the following advantages:
(1) In the present disclosure, a two-dimensional MOF-based nanozyme with an imitating enzyme activity is simply synthesized by an ultrasonic method and then applied to a biosensor without a complicated electrode modification process, thereby constructing an electrochemical biosensor with a high selectivity and a desirable sensitivity.
(2) In the present disclosure, the DSN assisted cycling signal amplification strategy is designed to achieve cycling of the target, thus allowing amplification of the electrochemical signal and increasing the sensitivity and selectivity.
(3) In the present disclosure, the electrochemical biosensor is creatively combined with the flow detection, and the flow detection of miRNA is achieved by the flow injection-batch method, as well as reuse of the electrodes and cyclic detection.
(4) In the present disclosure, the electrochemical biosensor has a high stability, and can still detect the target stably after nearly one month of electrode modification.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure.

Example 1

A homogeneous detection method for continuous detection of a miRNA by a MOF-based nanozyme included the following steps:

step 1, DSN-assisted signal amplification strategy was conducted: to form a hairpin structure, a hairpin DNA with a sequence 5'-AGTAGGAAGGCGAACTATACAACC-TACTACCTCA-3' of 5'-modified methylene blue was heated to 95° C. for 5 min, and then slowly cooled to a room temperature; in a 100 μL reaction system including a 1×DSN buffer (containing 50 mM of Tris-HCl at a pH value of 8.0; 5 mM of $MgCl_2$, and 1 mM of DTT), 0.3 U to 0.4 U of a DSN, 0.8 μM to 1.2 μM of HP, and different concentrations of targets were added, and incubated at 50° C. for 60 min to conduct enzyme amplification, and a DSN stop solution was added to an obtained reaction solution to terminate the enzyme amplification.

Example 2

Figure 2:
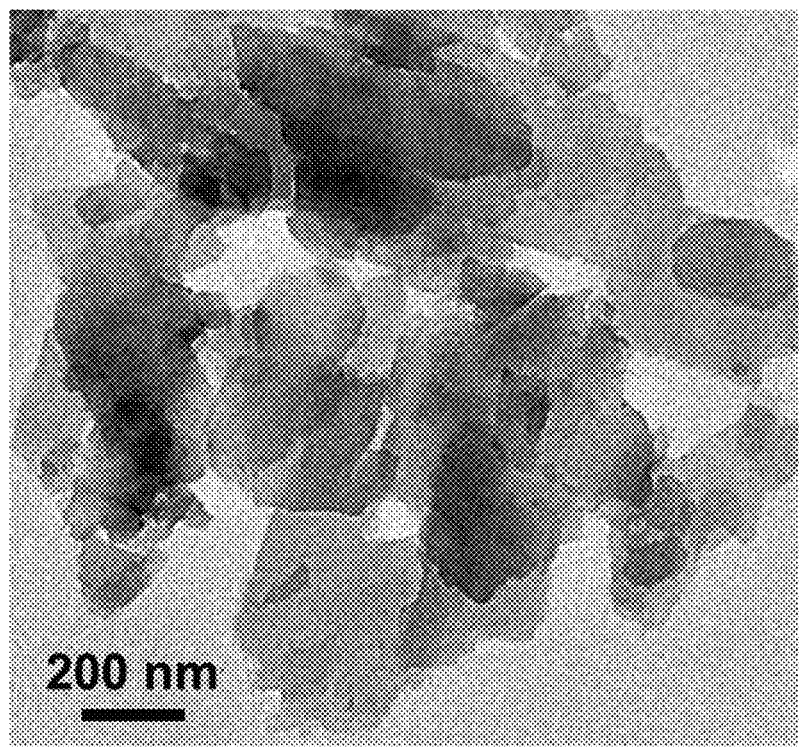
FIG. 2 shows a schematic diagram of a structure of a nanozyme synthesized in the homogeneous detection method for continuous detection of a miRNA by a MOF based nanozyme of the present disclosure.
Figure 3:
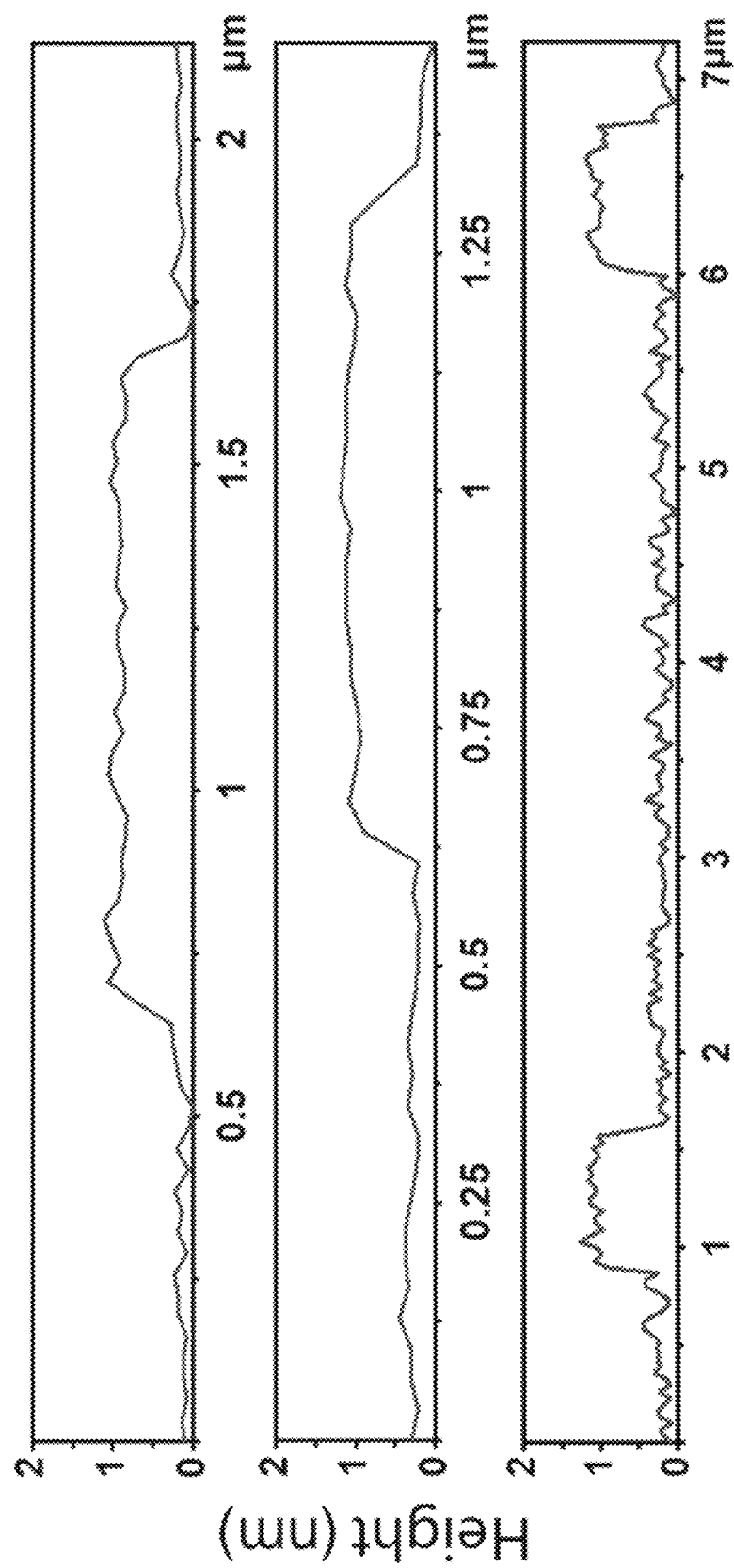
FIG. 3 shows a cross-sectional display of a Co-MOF nanomaterial of the present disclosure under an atomic force microscope (AFM)
Figure 4:
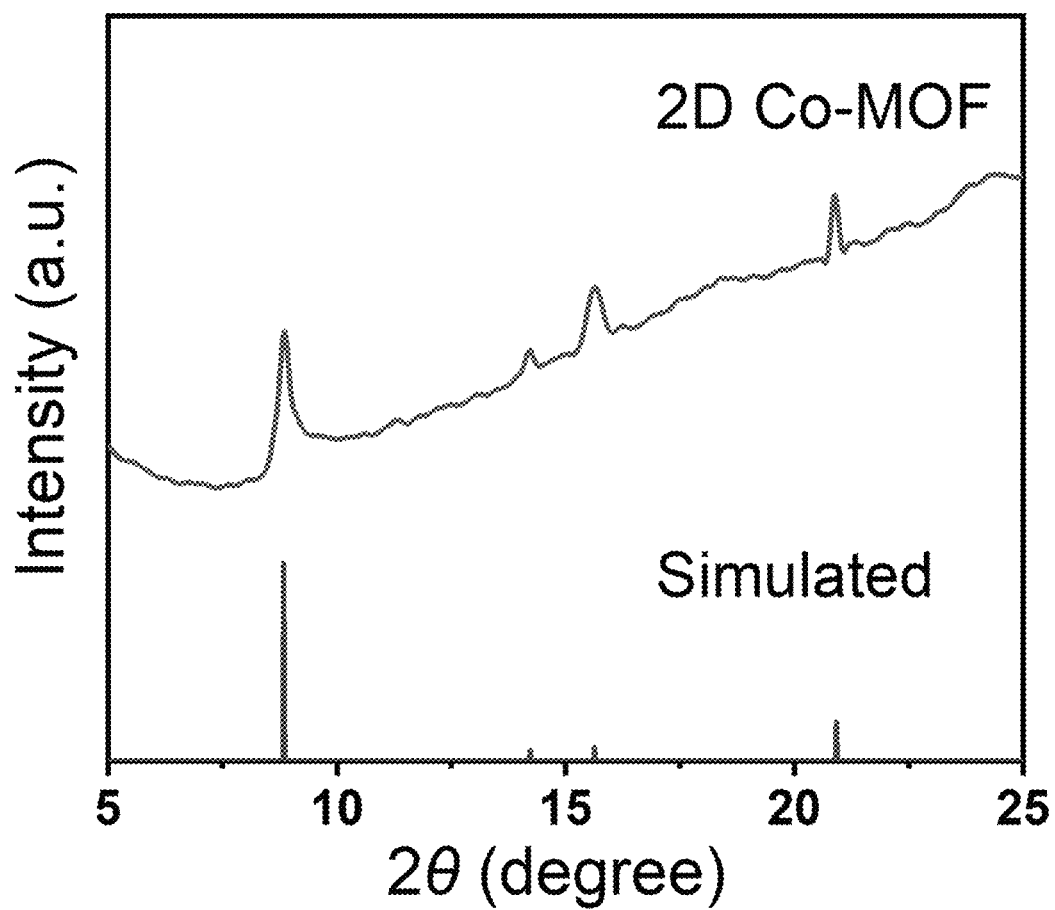
FIG. 4 shows an X-ray diffraction (XRD) spectrum of the MOF-based nanozyme of the present disclosure.

A 2D MOF-based nanozyme was synthesized. A composite was prepared by an ultrasonic method. Terephthalic acid (0.75 mmol) and $CoCl_2·6H_2O$ (0.375 mmol) were dissolved in a 50 mL test tube containing dimethylformamide (DMF, 32 mL), ethanol (2 mL), and water (2 mL), and subjected to an ultrasonic treatment. 0.8 mL of triethylamine was quickly injected into a resulting solution and stirred for 5 min to obtain a colloidal suspension. The colloidal suspension was subjected to an ultrasonic treatment for 8 h (at 40 kHz), followed by centrifugation, washing 3 times with ethanol, and vacuum-drying. A pink cobalt metal-organic framework (Co-MOF) powder was obtained and stored at 4° C. The nanozyme was diluted by a certain multiple, added dropwise onto a copper grid, dried at a room temperature, and subjected to transmission electron microscopy (SEM) scanning. Morphology characterization was conducted: as shown in FIG. 2, the synthesized nanozyme was in the form of a two-dimensional sheet. AFM characterization was conducted: as shown in FIG. 3, AFM profiles showed that Co-MOF nanomaterials had a surface thickness of about 1 nm, which were ultrathin with a smooth surface. Characterization of the synthesized Co-MOF by XRD was conducted: as shown in FIG. 4, XRD profiles of a resulting product were consistent with those reported in the literature (*Nature Energy*, 2016, 1(12)), indicating successful synthesis of the Co-MOF.

Example 3

Verification of a MOF-based nanozyme activity: a PBS (10 mM, pH=7.4) containing $H_2O_2$ (1 mM), tetramethylbenzidine (TMB, 0.5 mM), and the Co-MOF (1 mg/mL) was reacted at a room temperature for 30 min, and then an characteristic absorbance of a blue oxidation product TMB*+(TMB oxide) was recorded at 652 nm. As shown in FIG. 4, only in the presence of $H_2O_2$, the Co-MOF could catalyze oxidation of the TMB into the blue TMB*+and produce a strong absorption peak at 652 nm, indicating that the catalytic effect was possible only in the presence of hydrogen peroxide.

Example 4

Figure 5:
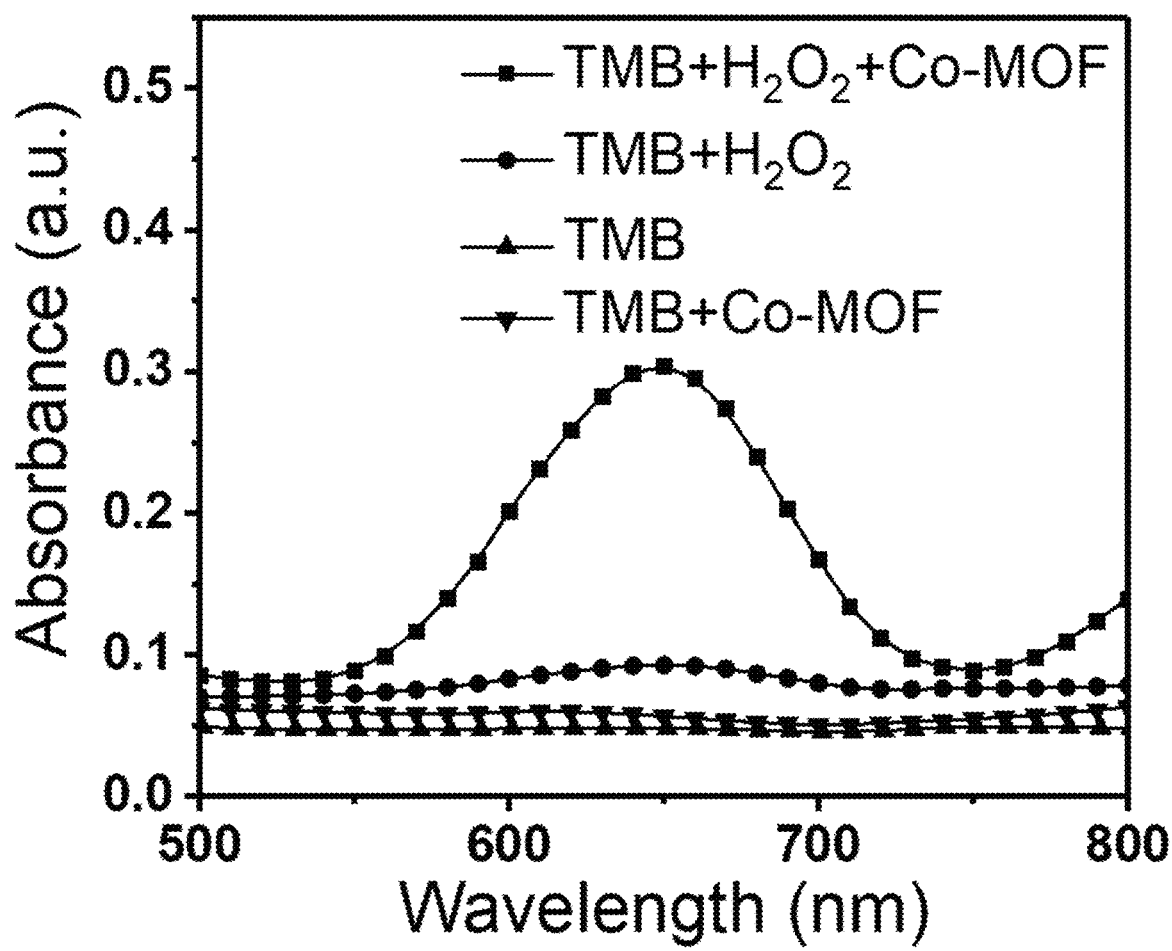
FIG. 5 shows a validation diagram of an activity of the MOF-based nanozyme of the present disclosure.

Construction and characterization of a Co-MOF/ITO electrode: an ITO electrode was washed with acetone, absolute ethanol, and a large amount of deionized water sequentially, and then blow-dried with $N_2$. The nanozyme was dispersed in ethanol at a concentration of 1 mg/mL, the ITO electrode was submerged in a resulting dispersion, and the MOF-based nanozyme was modified onto the ITO electrode by Langmuir adsorption to construct a Co-MOF/ITO electrode; the modified electrode was used as a working electrode, and a modification process of the ITO electrode was characterized by cyclic voltammogram (CV) and electrical impedance spectroscopy (EIS) using $[Fe(CN)6]^{4-/3-}$ as an electroactive probe. As shown in FIG. 5: a) the bare ITO; b) the MOF/ITO; c) the MOF/ITO+0.8 μM to 1.2 μM of HP+0.8 μM to 1.2 μM of let-7a; d) the MOF/ITO±0.8 μM to 1.2 μM of HP+0.8 μM to 1.2 μM of let-7a+DSN; with a decrease of the current and an increase of the impedance, it showed that the electrode was gradually modified successfully.

Example 5

Figure 6A:
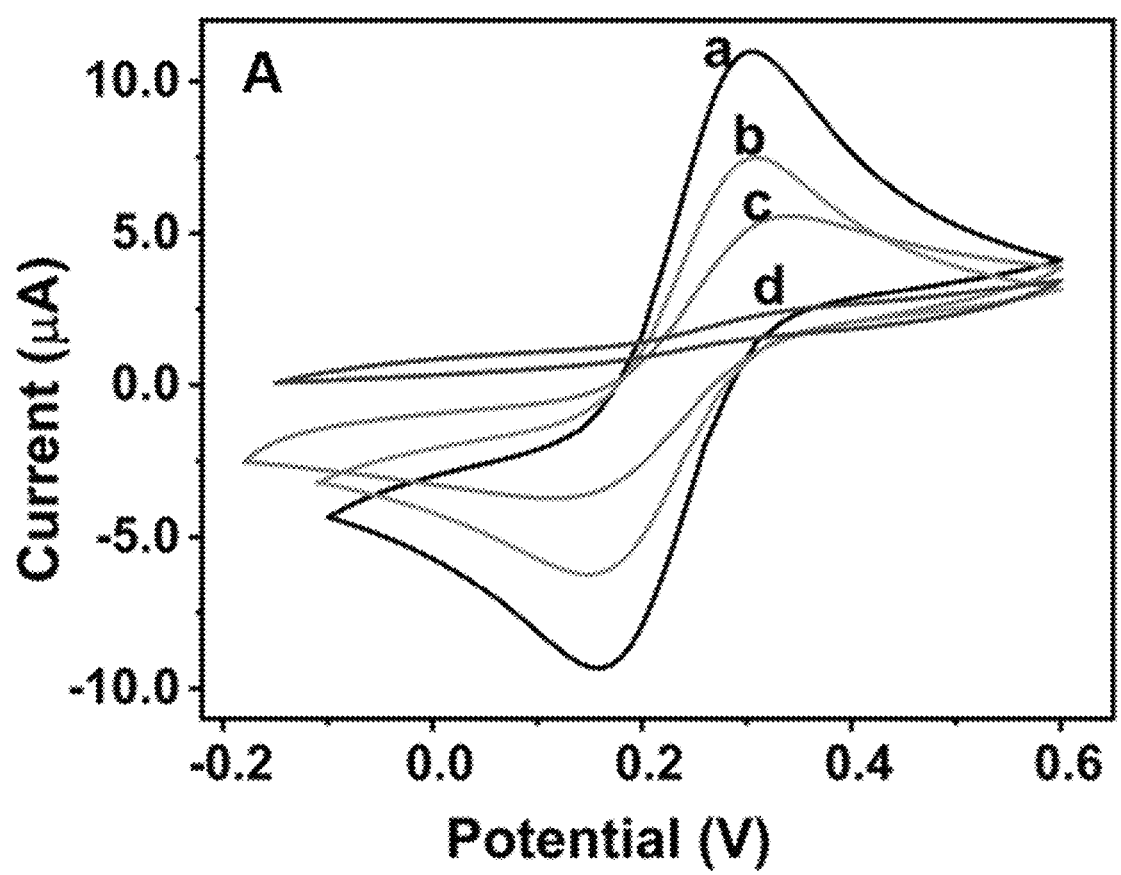
FIG. 6A-B show cyclic voltammogram (CV) and an electrochemical impedance spectroscopy (EIS) in the present disclosure.
Figure 6B:
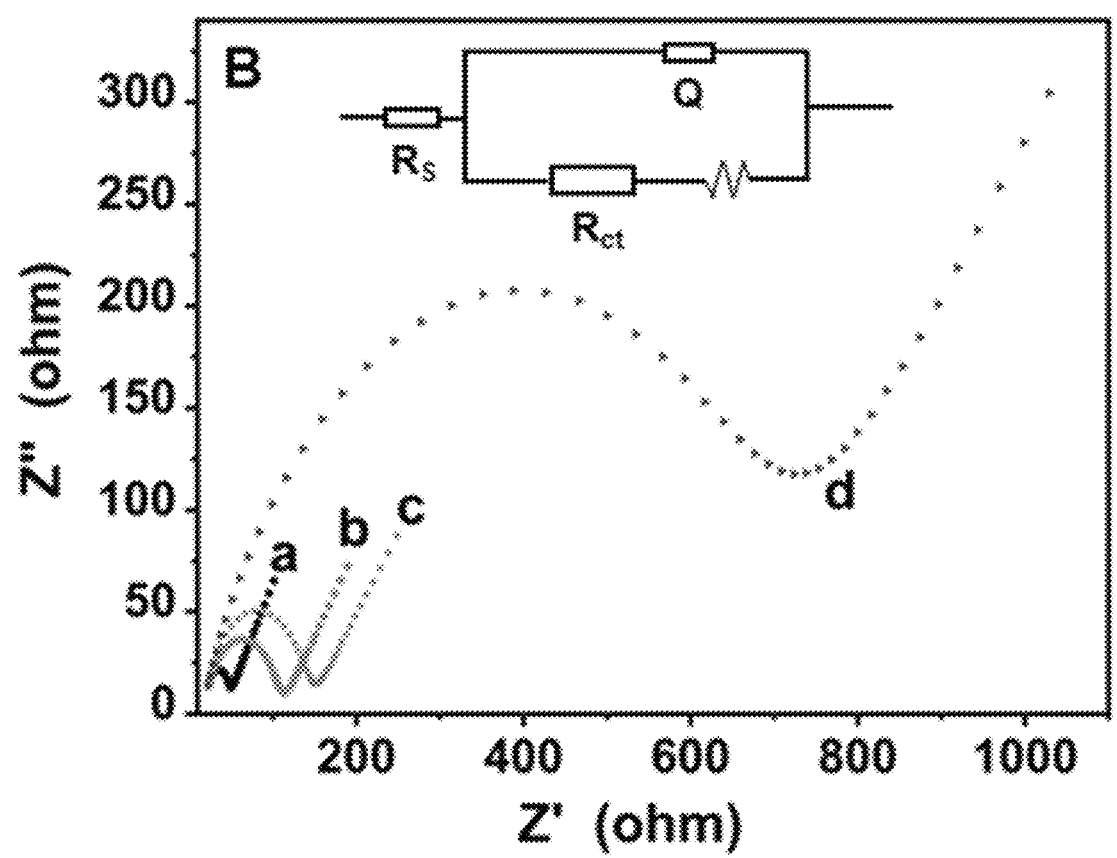
Figure 7:
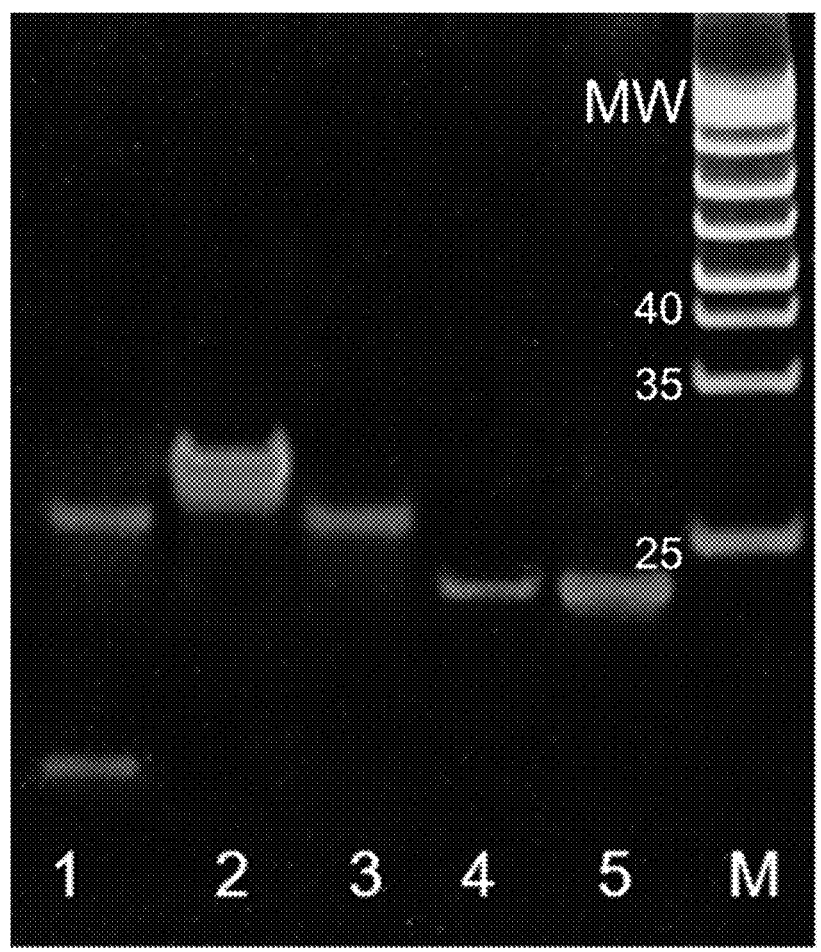
FIG. 7 shows a photogram of an amplification product in the present disclosure under UV-light.

Validation of the DSN-assisted signal amplification strategy: a feasibility of the cycling protocol was verified using polyacrylamide gel electrophoresis. To analyze an amplification product, a 12% polyacrylamide gel was prepared, the polyacrylamide gel electrophoresis was conducted at a constant voltage of 110 V for 45 min, stained with a gel red nucleic acid dye for 30 min, and then photographed under UV-light. All DNA/miRNA strands had a concentration of 0.8 μM to 1.2 μM. From FIG. 6A-B, it was clearly seen from left to right as follows: 0.8 μM to 1.2 μM of HP+0.8 μM to 1.2 μM of let-7a+DSN (1); 0.8 μM to 1.2 of HP+0.8 μM to 1.2 μM of let-7a (2); 0.8 μM to 1.2 μM of let-7a (3); 0.8 μM to 1.2 μM of HP+DSN (4); 0.8 μM to 1.2 μM of HP (5); Marker (M). Since DSN only cleaved double-stranded DNA with greater than 8 to 10 of complementary base pairs or DNA in a hybrid strand of DNA and RNA, it was found that the hairpin was not cleaved by the DSN (column 4). Only when the hairpin was opened by a miRNA to form a duplex (column 2), the DNA in the duplex was hydrolyzed, resulting in a short single-stranded DNA modified with methylene blue (column 1). While the miRNA bound to another hairpin DNAs to start a next round of cycle.

Example 6

Figure 1:
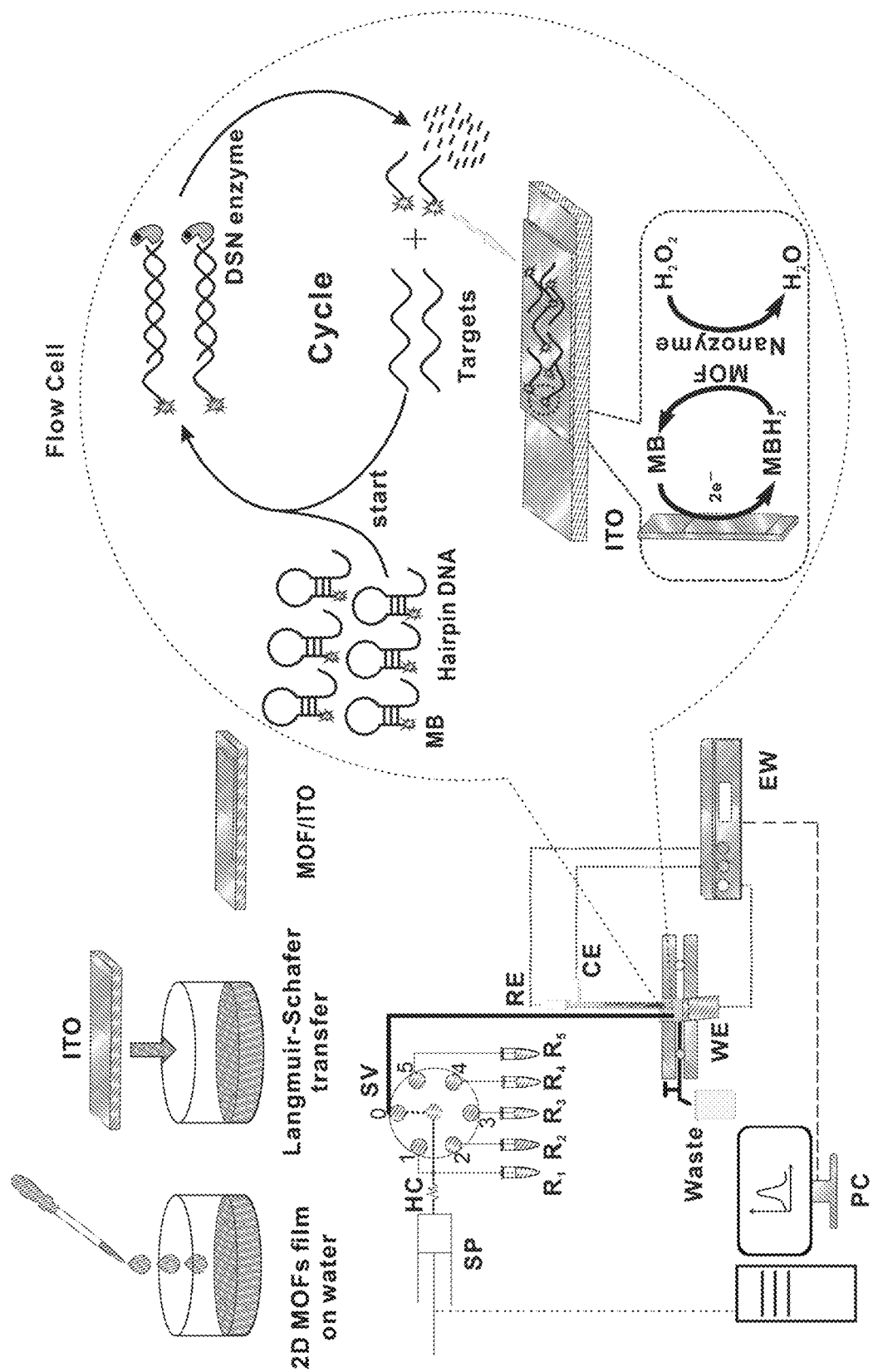
FIG. 1 shows a schematic diagram of a structure of a mobile injection device in a homogeneous detection method for continuous detection of a miRNA by a MOF-based nanozyme of the present disclosure.

Flow Analysis:

Step 1: as shown in FIG. 1, a 2D Co-MOF nanozyme that was easily prepared by ultrasonic waves was modified on a surface of the ITO electrode by Langmuir adsorption to construct a Co-MOF/ITO electrode; the constructed electrode was used as a working electrode, and a homogeneous electrochemical detection flow system was built as shown in FIG. 1: the flow system included a syringe pump (SP), a six-way valve (SV), an electrochemical analysis cell, an electrochemical workstation (SW) and a personal computer (PC), connecting pipes were all polytetrafluoroethylene pipes; a three-electrode system used for detection included a modified ITO electrode serving as the working electrode (WE), saturated silver chloride serving as a reference electrode (RE), and a platinum wire serving as a counter electrode (CE); a signal detection and recording device included a Princeton electrochemical workstation (WE) and a personal computer (PC); where $R_1$ to $R_2$ were sample solutions to be detected, and $R_3$ to $R_5$ were a PBS, a PBS containing 1.5 mM of $H_2O_2$, and a cDNA solution, respectively.

Figure 9A:
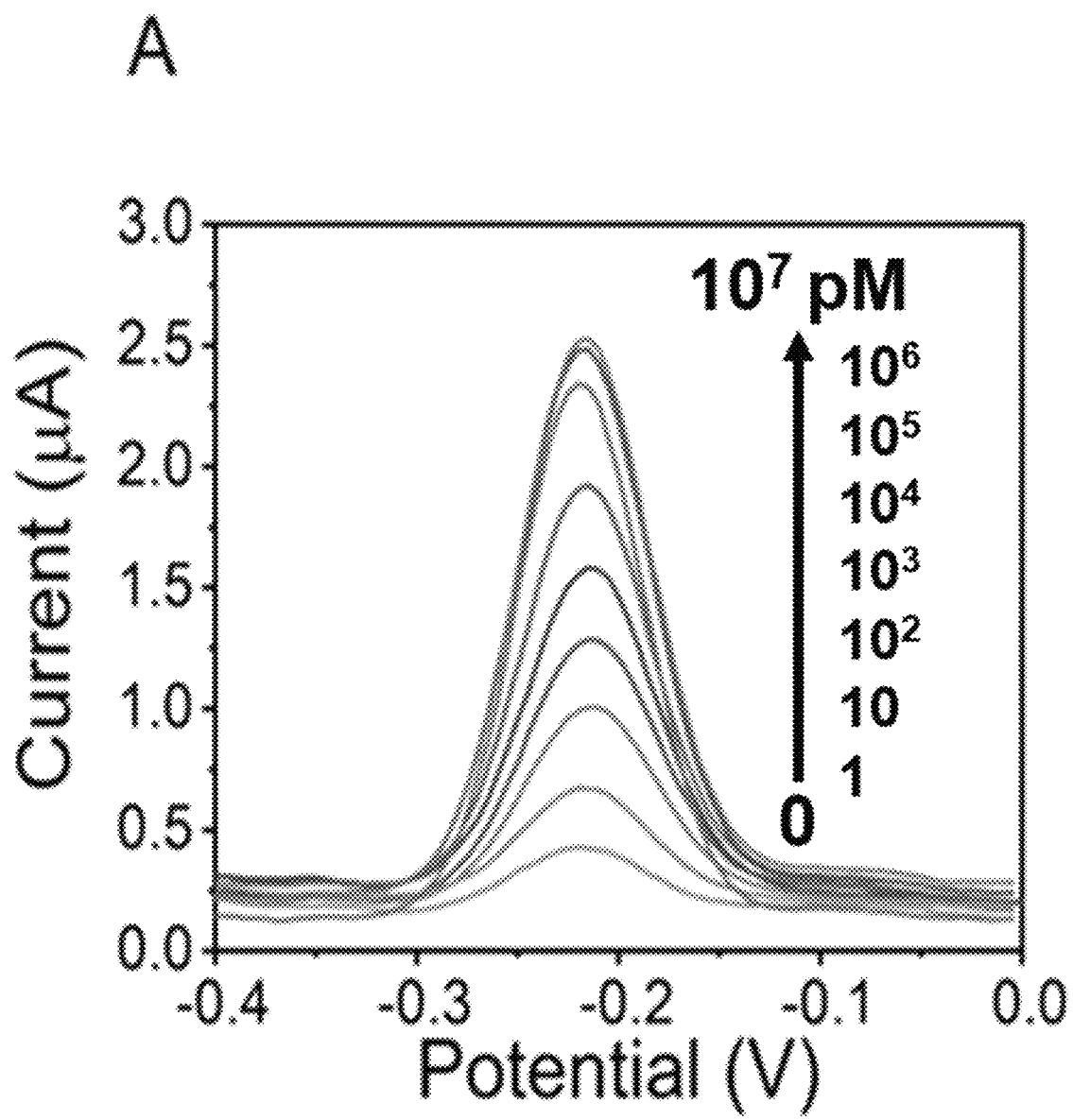
FIG. 9A-B show standard curves for DPV signal detection after DSN cycle on a series of different concentrations of targets of the present disclosure.
Figure 9B:
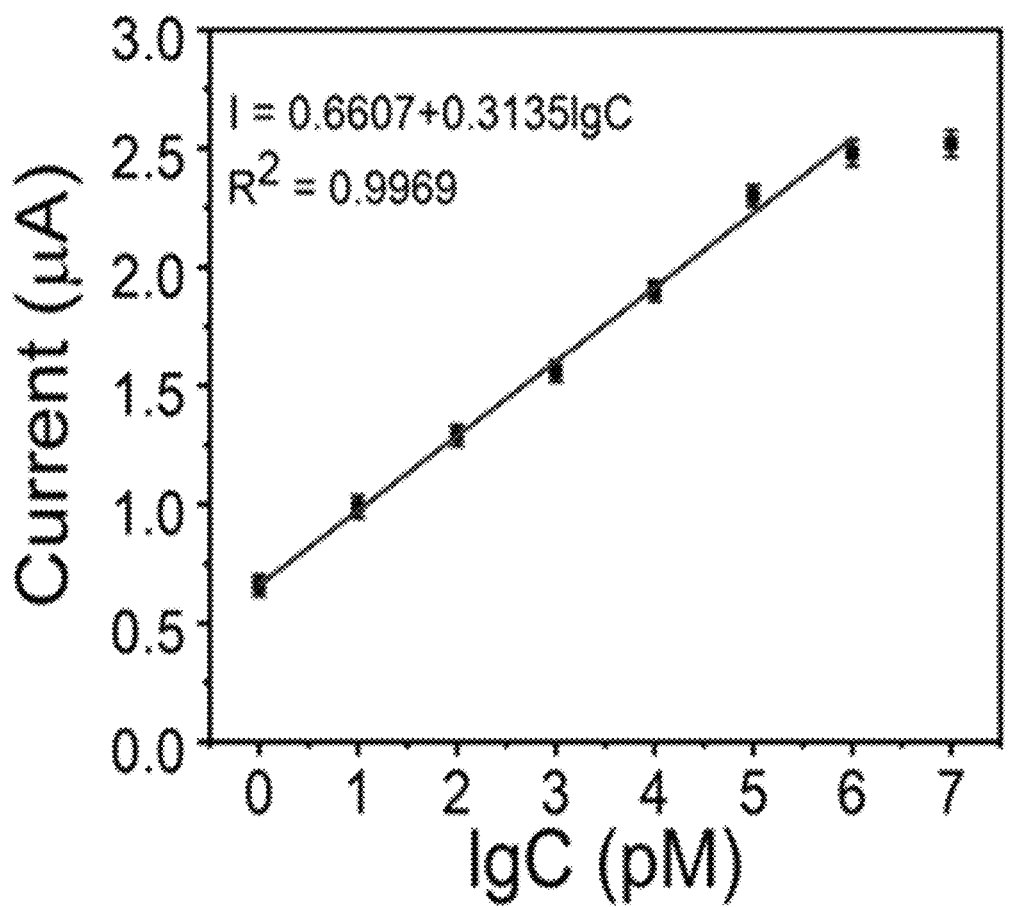

Step 2: before the experiment, a stationary coil and hoses connecting a 0 port and a flow cell inlet were filled with PBS (10 mM, pH=7.4). After a background signal was stable, solutions after DSN circulation in the liquid storage tanks $R_1$ or $R_2$ were introduced into an analytical unit through a flow mode, and incubated with the ITO electrode; the PBS containing 1.5 mM of $H_2O_2$ was injected in the flow mode, and a DPV response recorded by a computer was detected by the electrochemical workstation in a batch mode; a DPV test was conducted in the PBS (containing 1.5 mM of $H_2O_2$) at pH=7.4 with a scan potential range of 0 V to 0.4 V and a scan rate of 100 mV/s (VS Ag/AgCl). As shown in FIG. 9A-B, as a concentration of the target miRNA increased, the electrochemical signal increased continuously, and within a certain range, the electrochemical signal had a linear relationship with a logarithm of the miRNA concentration, so as to obtain a standard working curve; the standard working curve was I=0.6627+0.3135logC ($R^2$=0.9969), the linear range was 1 pM to $1\times10^6$ pM, and a detection limit was 0.12 pM according to a 3σ principle.

Figure 8:
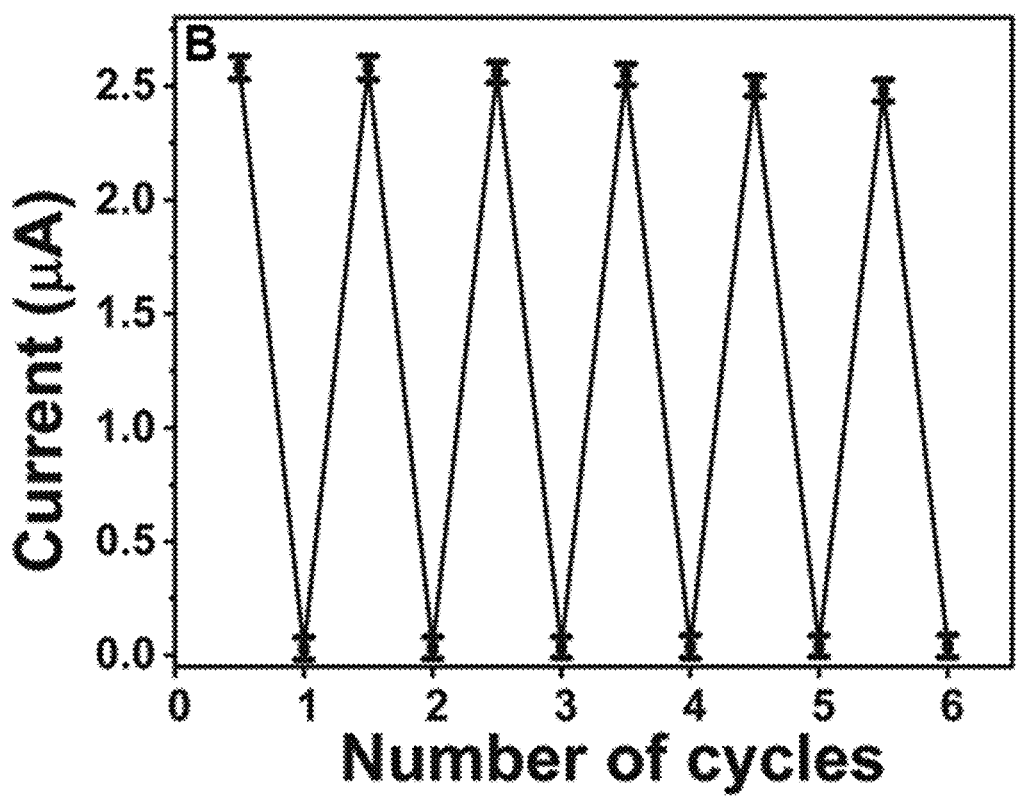
FIG. 8 shows a graph of a DPV response signal of a biosensor in the present disclosure.

Step 3: Validation of electrode reproducibility: competitive elution was conducted on the MOF/ITO electrode in the flow mode. The MOF/ITO electrode in step 7 was eluted by a cDNA (10 μM) with a sequence 5'-TCATCCTTCCGC-3' and serving as a mobile phase in the liquid storage tank $R_5$, with a syringe pump at 20 μL/min for 20 min; an eluted MOF/ITO electrode was then rinsed with the PBS in the liquid storage tank $R_3$. The PBS (containing 1.5 mM of $H_2O_2$, pH=7.4) containing hydrogen peroxide in the liquid storage tank $R_4$ was introduced into the analytical unit through the flow mode, and a DPV signal of a biosensor was recorded in the batch mode. After the signal was stable, steps 3 to 4 were repeated to enter a next round of cycle. As shown in FIG. 8, after six cycles, the signal was basically unchanged.

Step 4, actual sample detection: a detection ability of the detection system for RNA in complex matrices was tested by a standard addition method. A human serum sample was diluted ten-fold, a series of concentrations of target RNA samples were added to a diluted human serum, and then detected according to the process of step 2. A standard recovery rate was measured at 99.51% to 102.3%, indicating that the detection system had desirable selectivity and anti-interference ability, and had a certain application value even in complex matrices.

Step 5, selective verification: after different interfering RNAs were passed through a same cycle as that in step 2, the detected DPV signals could be ignored, proving that the present disclosure had a desirable selectivity to the target in the presence of interfering RNAs.

Example 7

Verification of a storage stability: the constructed electrode could be stored at a room temperature and 4° C. for a long time, and still maintained a desirable detection effect after a maximum of 30 d.

In the present disclosure, a two-dimensional MOF based nanozyme with an imitating enzyme activity is simply synthesized by an ultrasonic method and then applied to a biosensor without a complicated electrode modification process, thereby constructing an electrochemical biosensor with a high selectivity and a desirable sensitivity.

In the present disclosure, the DSN-assisted cycling signal amplification strategy is designed to achieve cycling of the target, thus allowing amplification of the electrochemical signal and increasing the sensitivity and selectivity.

In the present disclosure, the electrochemical biosensor is creatively combined with the flow detection, and the flow detection of miRNA is achieved by the flow injection-batch method, as well as reuse of the electrodes and cyclic detection.

In the present disclosure, the electrochemical biosensor has a high stability, and can still detect the target stably after nearly one month of electrode modification.

The tbregoing, are merely descriptions of preferred specific embodiments of the present disclosure, but the protection scope of the present disclosure is not limited thereto. Any equivalent replacement or modification made within a technical scope of the present disclosure by a person skilled in the art according to the technical solutions of the present disclosure and inventive concepts thereof shall fall within the protection scope of the disclosure.

What is claimed is:

1. A homogeneous detection method for continuous detection of a miRNA by a metal organic framework (MOF)-based nanozyme, comprising:
    step 1: conducting a duplex-specific nuclease (DSN)-assisted signal amplification strategy in a homogeneous solution;
    step 2: conducting continuous detection of the miRNA by a flow injection-batch method, comprising: in a flow injection mode, enriching single-stranded DNAs by a single-stranded DNA adsorption capacity of an indium tin oxide (ITO) electrode, wherein the ITO electrode is modified by an MOF-based nanozyme as an MOF-based nanozyme-modified ITO electrode; and in a batch mode, further amplifying the signal by using a peroxidase-mimicking activity of the MOF-based nanozyme for detection of the miRNA; and
    step 3: in a flow mode, competitively eluting DNA on the MOF-based nanozyme-modified ITO electrode using a complementary DNA (cDNA) as a mobile phase; and repeating the steps 1 to 3 to conduct a next round of the miRNA detection;
    wherein in the step 1, the DSN-assisted signal amplification strategy comprises: heating a methylene blue-labeled hairpin DNA sequence to 95° C. for 5 min, and cooling to a room temperature to form a hairpin structure; adding a DSN at a final concentration of 0.15 U to 0.5 U and the hairpin DNA at a final concentration of 0.8 μM to 1.2 μM to a nucleic acid amplification buffer, adding a miRNA sample to be tested, and conducting incubation at 45° C. to 60° C. for 50 min to 70 min; and adding a DSN stop solution to an obtained reaction solution to terminate the signal amplification; and
    in the step 2, the flow injection-batch method comprises: in the flow injection mode, injecting a solution obtained in the step 1 into an electrochemical analysis cell by a flow injection, and conducting incubation in a batch mode for 30 min to 60 min; injecting a phosphate-buffered saline (PBS) containing hydrogen peroxide into the electrochemical analysis cell by flow injection; conducting detection by differential pulse voltammetry (DPV) or linear voltammetry or an impedance method in the batch mode using a three-electrode system to obtain an electrochemical signal, and obtaining a concentration of the miRNA sample to be tested according to a relationship between the electrochemical signal and a miRNA concentration, wherein recycling of the MOF-based nanozyme modified ITO electrode and continuous detection of the miRNA are realized.

2. The homogeneous detection method for continuous detection of a miRNA by a MOF-based nanozyme according to claim 1, wherein the nucleic acid amplification buffer comprises 50 mM of Tris-HCl at a pH value of 8.0, 5 mM of magnesium chloride ($MgCl_2$), and 1 mM of dithiothreitol (DTT); and the DSN stop solution is 10 mM of ethylene diamine tetraacetic acid (EDTA).

3. The homogeneous detection method for continuous detection of a miRNA by a MOF-based nanozyme according to claim 1, wherein in the step 2, modifying the ITO electrode by the MOF-based nanozyme further comprises: the ITO electrode is washed with acetone, absolute ethanol, and a large amount of deionized water sequentially before use, and blow-dried with $N_2$ to be cleaned; the cleaned ITO electrode is immersed in an ethanol dispersion of the MOF-based nanozyme in a concentration of 1 mg/mL repeatedly for several times, and then the immersed ITO electrode is naturally-dried to obtain the MOF-based nanozyme-modified ITO electrode.

4. The homogeneous detection method for continuous detection of a miRNA by a MOF-based nanozyme according to claim 1, wherein in the step 2, the electrochemical analysis cell is a polytetrafluoroethylene cell or a polypropylene cell or a glass cell; and in step 2, the three-electrode system comprises a platinum wire serving as a counter electrode, saturated silver/silver chloride serving as a reference electrode, and the MOF-based nanozyme-modified ITO electrode serving as a working electrode.

5. The homogeneous detection method for continuous detection of a miRNA by a MOF-based nanozyme according to claim 1, wherein in the step 2, the DPV in the batch mode is conducted by: scanning in a PBS at a pH value of 7.4 containing 1.5 mM of $H_2O_2$, with a scan range of 0 V to −0.4 V and a scan rate of 100 mV/s; the linear voltammetry in the batch mode is conducted by: scanning in the PBS at a pH value of 7.4 containing 1.5 mM of $H_2O_2$, with a scan range of 0 V to −0.4 V and a scan rate of 100 mV/s; and the impedance method is conducted in a potassium ferricyanide solution, with a scan range of 0.1 Hz to 10,000 Hz and an amplitude of 5 mV.

6. The homogeneous detection method for continuous detection of a miRNA by a MOF-based nanozyme according to claim 1, wherein in the step 2, the flow injection, in the flow injection-batch method, is conducted with a syringe pump at independently 10 μL/min to 40 μL/min for independently 25 min to 60 min.

7. The homogeneous detection method for continuous detection of a miRNA by a MOF-based nanozyme according to claim 1, wherein in the steps 2 and 3, the MOF-based nanozyme, in a two-dimensional form, is synthesized by an ultrasonic method, comprising the following steps: dissolving 0.75 mmol of terephthalic acid and 0.375 mmol of a metal ion salt selected from the group consisting of cobalt chloride hexahydrate, manganese chloride, and ferric chloride in a 50 mL test tube containing 32 mL of dimethylformamide, 2 mL of ethanol, and 2 ml of water, and conducting an ultrasonic treatment; injecting 0.8 mL of triethylamine into an obtained solution, and stirring for 5 min to obtain a colloidal suspension; conducting an ultrasonic treatment on the colloidal suspension at 40 KHz for 8 h; followed by centrifugation, washing three times with the ethanol, and vacuum-drying to obtain a MOF-based nanozyme powder, and then storing at 4° C.

\* \* \* \* \*